(12) United States Patent
Yokoyama et al.

(10) Patent No.: US 11,142,146 B2
(45) Date of Patent: Oct. 12, 2021

(54) GROMMET

(71) Applicant: Yazaki Corporation, Tokyo (JP)

(72) Inventors: Satoshi Yokoyama, Aichi (JP);
Masayoshi Ogawa, Aichi (JP);
Masafumi Nakayasu, Aichi (JP); Shota Kinoshita, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/082,325

(22) Filed: Oct. 28, 2020

(65) Prior Publication Data

US 2021/0122309 A1 Apr. 29, 2021

(30) Foreign Application Priority Data

Oct. 29, 2019 (JP) .............................. JP2019-195790

(51) Int. Cl.
*H02G 3/04* (2006.01)
*B60R 16/02* (2006.01)

(52) U.S. Cl.
CPC ....... *B60R 16/0222* (2013.01); *H02G 3/0468* (2013.01); *H02G 3/0481* (2013.01)

(58) Field of Classification Search
CPC .... B60R 16/0222; H02G 15/013; H02G 3/22; H02G 3/0675; H02G 15/02; H02G 15/04; H02G 15/046; H02G 15/06; H02G 15/076; H02G 15/113; H02G 15/117; H02G 1/145; H02G 3/0658; H02G 3/0666; H02G 3/083; H02G 3/088; H01B 17/58; Y10T 16/05; H01R 13/5205

USPC ........................................................ 174/668
See application file for complete search history.

(56) References Cited

U.S. PATENT DOCUMENTS

| 4,474,489 A | * | 10/1984 | Simon .................. H02G 15/007 403/195 |
| 6,372,995 B1 | * | 4/2002 | Mochizuki .......... B60R 16/0222 174/152 G |
| 7,073,227 B2 | * | 7/2006 | Fukushima ............... F16L 5/10 16/2.2 |

(Continued)

FOREIGN PATENT DOCUMENTS

JP H11-252748 A 9/1999

*Primary Examiner* — Krystal Robinson
(74) *Attorney, Agent, or Firm* — Sughrue Mion, PLLC

(57) ABSTRACT

A grommet includes: an enlarged-diameter cylindrical portion that has a fitted groove that is around a larger-diameter-side peripheral portion and is configured to be fitted to a through hole of a panel, and an elastically deformable portion that extends from the larger-diameter-side peripheral portion to a smaller-diameter-side peripheral portion and is elastically deformable; and a smaller-diameter cylindrical portion that is configured to be connected with the smaller-diameter-side peripheral portion of the enlarged-diameter cylindrical portion, and in which a wire harness is inserted. A reinforcement rib protrudes from an interior surface of the elastically deformable portion of the enlarged-diameter cylindrical portion. The reinforcement rib is T-shaped. The reinforcement rib has depressions for deformation. The depressions for deformation face in the opposite directions. An intersection of the reinforcement rib that is T-shaped is between the depressions for deformation.

4 Claims, 6 Drawing Sheets

(56) References Cited

U.S. PATENT DOCUMENTS

| | | | | |
|---|---|---|---|---|
| 8,872,043 | B2* | 10/2014 | Roseen | H02G 15/22 |
| | | | | 174/650 |
| 9,853,437 | B2* | 12/2017 | Coyle | H02G 3/065 |
| 2001/0044984 | A1* | 11/2001 | Ono | H02G 3/22 |
| | | | | 16/2.5 |
| 2003/0015339 | A1* | 1/2003 | Sato | B60R 16/0222 |
| | | | | 174/668 |
| 2003/0226233 | A1* | 12/2003 | Katayama | H02G 3/22 |
| | | | | 16/2.1 |
| 2015/0305174 | A1* | 10/2015 | Yoshimura | B60R 16/0222 |
| | | | | 174/668 |
| 2017/0305366 | A1* | 10/2017 | Ujita | B60R 16/02 |
| 2019/0111869 | A1* | 4/2019 | Ogawa | B60R 16/0222 |
| 2019/0393687 | A1* | 12/2019 | Yokoyama | B60R 16/0215 |
| 2020/0076117 | A1* | 3/2020 | Ogawa | H01R 13/743 |
| 2021/0174993 | A1* | 6/2021 | Yokoyama | B60R 16/0222 |

* cited by examiner

GROMMET

CROSS-REFERENCE TO RELATED APPLICATIONS

The present application is based on, and claims priority from Japanese Patent Application No. 2019-195790, filed on Oct. 29, 2019, the entire contents of which are incorporated herein by reference.

TECHNICAL FIELD

The present application relates to a grommet.

BACKGROUND

A main body of a grommet disclosed in JP H11-252748 A includes a peripheral wall, an insertion cylinder, and an elastic wall. The peripheral wall is cylindrical. An annular groove extends around the peripheral wall. The annular groove is fitted to a through hole of a panel. The insertion cylinder has a small diameter. A wire harness is inserted in the insertion cylinder. The elastic wall is between the peripheral wall and the insertion cylinder. The elastic wall is integral with the peripheral wall and the insertion cylinder. Further, a reinforcement rib protrudes from an interior surface of the main body of the grommet. That is to say, the reinforcement rib protrudes from an interior surface of the peripheral wall and an interior surface of the elastic wall. The reinforcement rib has a shape like a cross.

SUMMARY

However, when the grommet disclosed in JP H11-252748 A is attached to a vehicle, that is to say when the elastic wall of the main body of the grommet is inserted into a through hole of a panel and the peripheral wall is fitted to the through hole, it is difficult to deform the elastic wall of the main body of the grommet since the interior surface of the main body of the grommet has the reinforcement rib that has a shape like a cross. Therefore, the insertion force is large.

The present application is made to solve the above problem. It is an object of the present application to provide the following grommet. The grommet allows a reinforcement rib to be easily deformed when the grommet is inserted into and attached to a through hole of a panel. Consequently, the insertion force is decreased. Further, after the grommet is attached, the reinforcement rib decreases a deformation of an elastically deformable portion, and thus increases a holding force.

A grommet according to an aspect of the present application includes: an enlarged-diameter cylindrical portion that has a larger-diameter-side peripheral portion, a fitted groove configured to be fitted to a through hole of a panel, and an elastically deformable portion that extends from the larger-diameter-side peripheral portion to a smaller-diameter-side peripheral portion and is elastically deformable; and a smaller-diameter cylindrical portion that is configured to be connected with the smaller-diameter-side peripheral portion of the enlarged-diameter cylindrical portion, and in which a wire harness is inserted. A reinforcement rib protrudes from an interior surface of the elastically deformable portion of the enlarged-diameter cylindrical portion. The reinforcement rib is T-shaped. The reinforcement rib has depressions for deformation. The depressions for deformation face in opposite directions. An intersection of the reinforcement rib that is T-shaped is between the depressions for deformation.

The reinforcement rib may have a lateral rib and a lengthways rib, and thus is T-shaped, and the lateral rib may have the depressions for deformation, the depressions for deformation may be near the intersection, and the depressions for deformation face in opposite directions.

The reinforcement rib may have a lateral rib and a lengthways rib, and thus is T-shaped, and the lateral rib may have the depressions for deformation, the depressions for deformation may be apart from the intersection, and the depressions for deformation face in opposite directions.

The elastically deformable portion of the enlarged-diameter cylindrical portion may have a shape like an elliptical cone, and the elastically deformable portion that has a shape like an elliptical cone may have an interior surface, two of the reinforcement rib that is T-shaped may be on both sides, respectively, on the interior surface, and the two reinforcement ribs may be opposite each other along a longer axis of the interior surface of the elastically deformable portion.

The above configurations each provide the following grommet. The grommet allows a reinforcement rib(s) to be easily deformed when the grommet is inserted into and attached to a through hole of a panel. Consequently, the insertion force is decreased. Further, after the grommet is attached, the reinforcement rib(s) decrease(s) a deformation of an elastically deformable portion, and thus increase(s) a holding force.

DETAILED DESCRIPTION

Hereinafter, a grommet according to a first embodiment of the present application will be described in detail with reference to the drawings.

Figure 1:
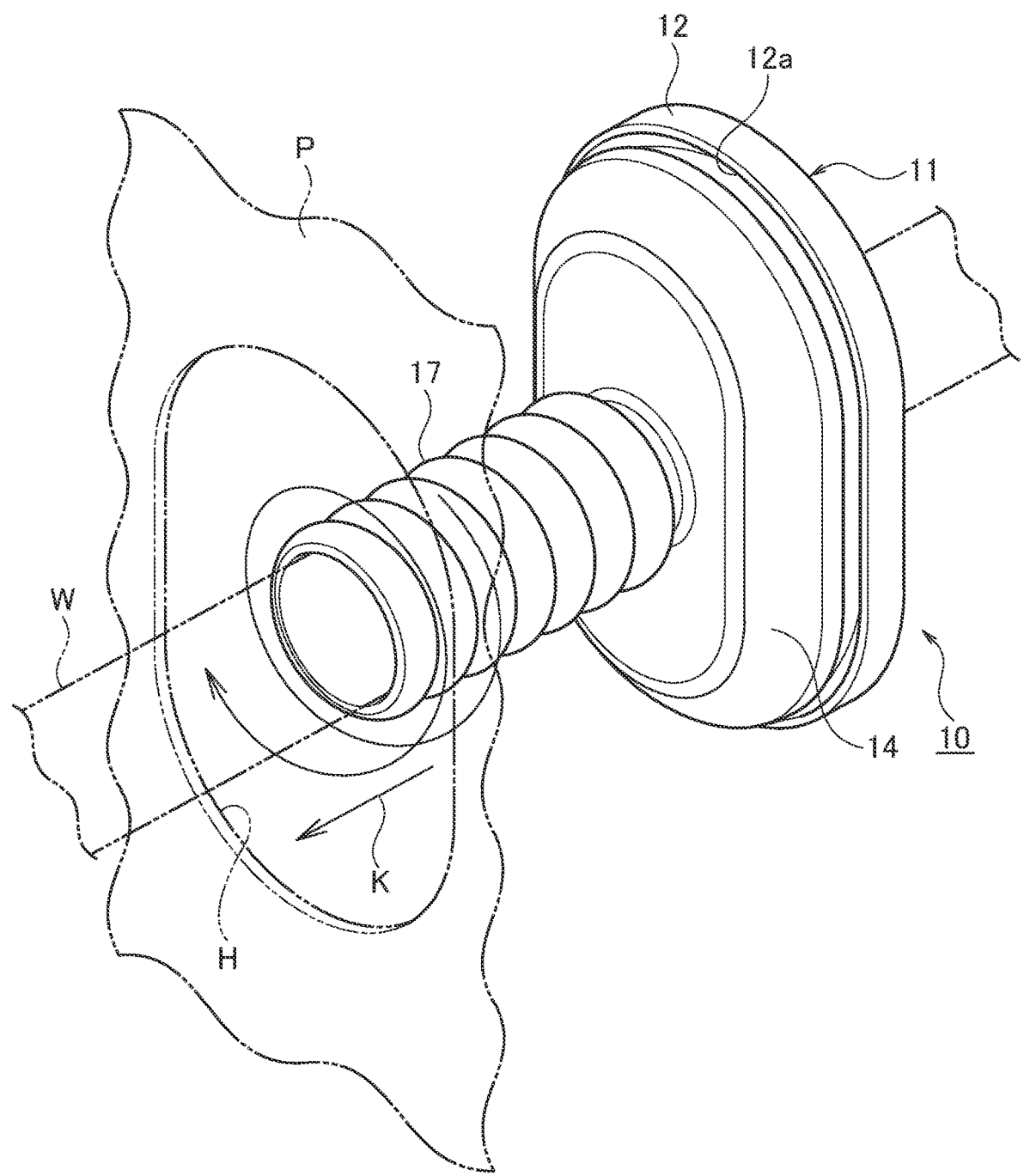
FIG. 1 is a perspective view that illustrates one example of a grommet according to a first embodiment of the present application that has not been attached to a vehicle.
Figure 2:
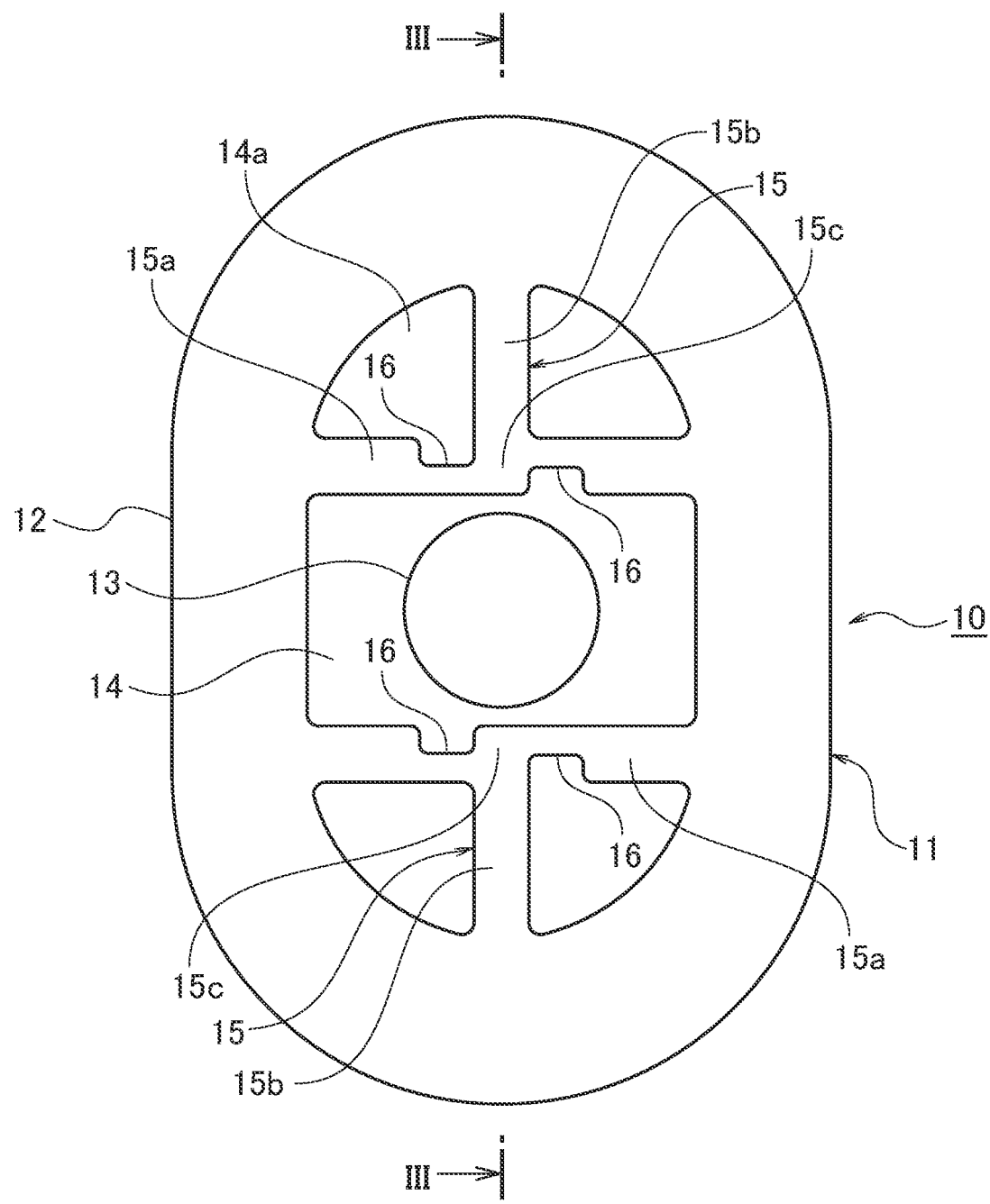
FIG. 2 is a back view of the grommet according to the first embodiment of the present application seen in a vehicle attachment direction.
Figure 3:
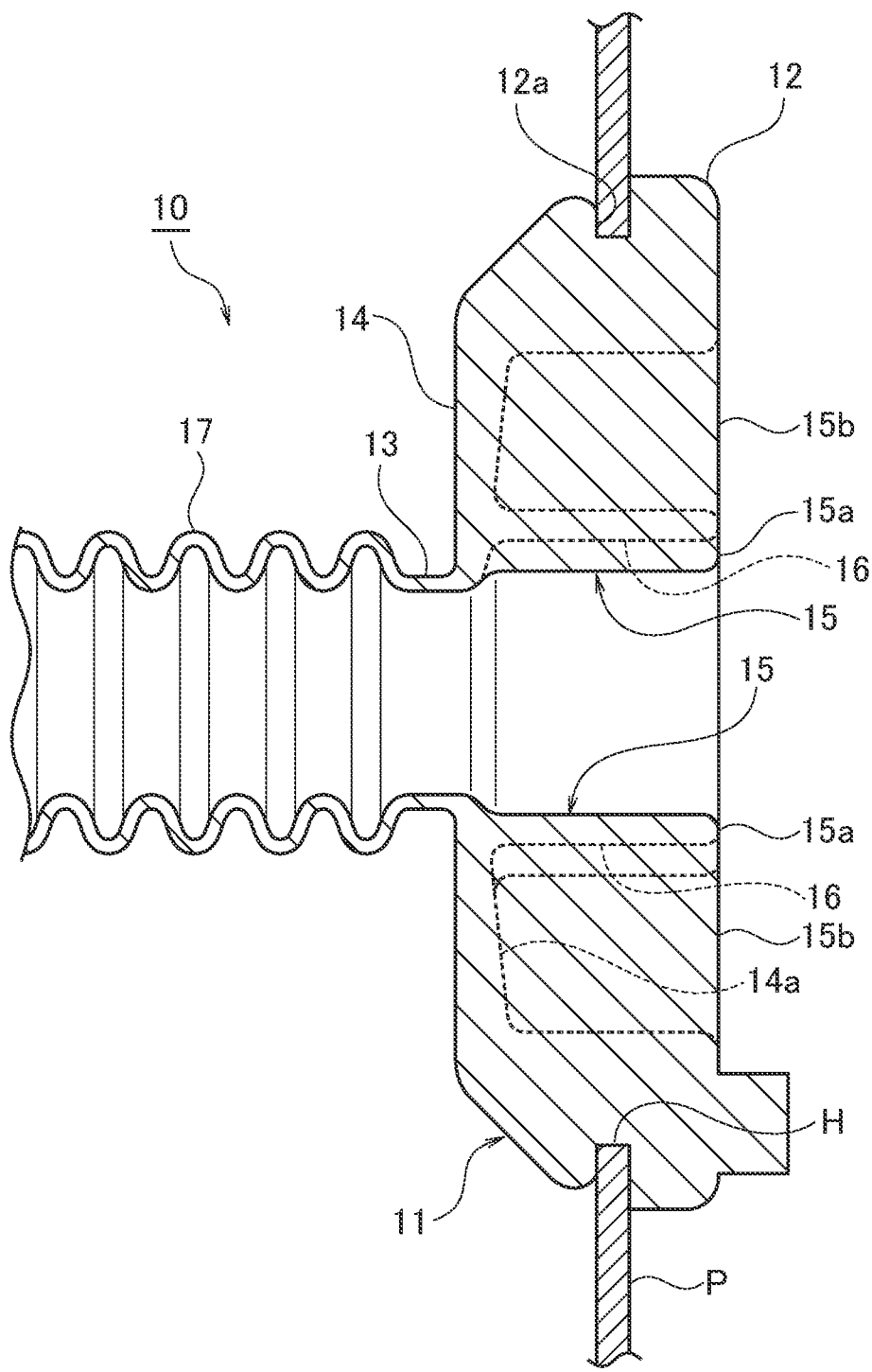
FIG. 3 is a cross-sectional view along line III-III in FIG. 2.

As illustrated in FIGS. 1 to 3, a grommet 10 is made of, for example, synthetic rubber or an elastomer that is elastic, and the grommet 10 includes an enlarged-diameter cylindrical portion 11 and a cylindrical bellows portion (smaller-diameter cylindrical portion) 17. The grommet 10 is used for a side door, and is attached to an elliptical through hole H of a door panel (panel) P of a vehicle. That is, the grommet 10 includes the enlarged-diameter cylindrical portion 11 and the cylindrical bellows portion 17. The enlarged-diameter cylindrical portion 11 has a larger-diameter-side peripheral portion 12, a fitted groove 12a fitted to the through hole H, and an elastically deformable portion 14. The elastically deformable portion 14 extends from the larger-diameter-side peripheral portion 12 to a smaller-diameter-side peripheral portion 13. The elastically deformable portion 14 is elastically deformable. The cylindrical bellows portion 17 is connected with the smaller-diameter-side peripheral portion 13. A wire harness W is inserted in the cylindrical bellows portion 17.

As illustrated in FIGS. 1 to 3, the larger-diameter-side peripheral portion 12 of the enlarged-diameter cylindrical portion 11 has a large thickness, and is elliptically annular. The smaller-diameter-side peripheral portion 13 of the enlarged-diameter cylindrical portion 11 has a thin thickness, has a short length, and is cylindrical. The elastically deformable portion 14 of the enlarged-diameter cylindrical portion 11 has a thickness that is smaller than the thickness of the larger-diameter-side peripheral portion 12, and has a shape like an elliptical cone. The elastically deformable portion 14 that has a shape like an elliptical cone has an interior surface 14a. The interior surface 14a is opposite a surface of the enlarged-diameter cylindrical portion 11 on which the cylindrical bellows portion 17 is connected with the smaller-diameter-side peripheral portion 13. Reinforcement ribs 15 integrally protrude from the interior surface 14a. The reinforcement ribs 15 are T-shaped. The reinforcement ribs 15 are on upper and lower sides, respectively, on the interior surface 14a. The smaller-diameter-side peripheral portion 13 is between the upper and lower sides. The reinforcement ribs 15 are opposite each other along a longer axis of the enlarged-diameter cylindrical portion 11. Each of the two reinforcement ribs 15 on the upper and lower sides, respectively, has a lateral rib 15a and a lengthways rib 15b, and thus is T-shaped. The lateral rib 15a extends in parallel to a lateral direction of the elastically deformable portion 14 (along a shorter axis of the enlarged-diameter cylindrical portion 11). The lengthways rib 15b extends from a center of the lateral rib 15a perpendicularly (along a longer axis of the enlarged-diameter cylindrical portion 11). The lateral rib 15a has depressions 16 for deformation. The depressions 16 for deformation are near an intersection 15c of the lateral rib 15a and the lengthways rib 15b. The depressions 16 for deformation are made lower upward or downward along the longer axis of the enlarged-diameter cylindrical portion 11. The depressions 16 for deformation face in the opposite directions. The intersection 15c is between the depressions 16 for deformation along the shorter axis of the enlarged-diameter cylindrical portion 11.

As illustrated in FIGS. 1 and 3, the cylindrical bellows portion 17 that is the smaller-diameter cylindrical portion protects the wire harness W inserted in the cylindrical bellows portion 17. When the grommet 10 is attached to the through hole H of the door panel P, the cylindrical bellows portion 17 is pulled in a vehicle attachment direction (fitting direction) K while the cylindrical bellows portion 17 is rotated to insert the grommet 10. Consequently, the fitted groove 12a that is part of the enlarged-diameter cylindrical portion 11 and is elliptically annular is fitted to and engaged with an edge of the through hole H.

Figure 4A:
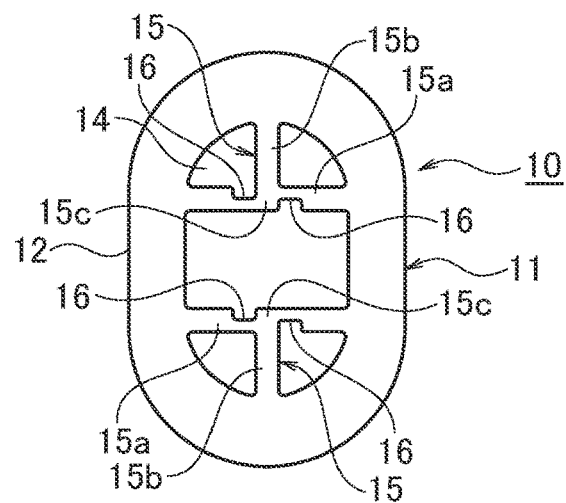
FIG. 4A is a schematic view of the grommet according to the first embodiment of the present application that has not been inserted.
Figure 4B:
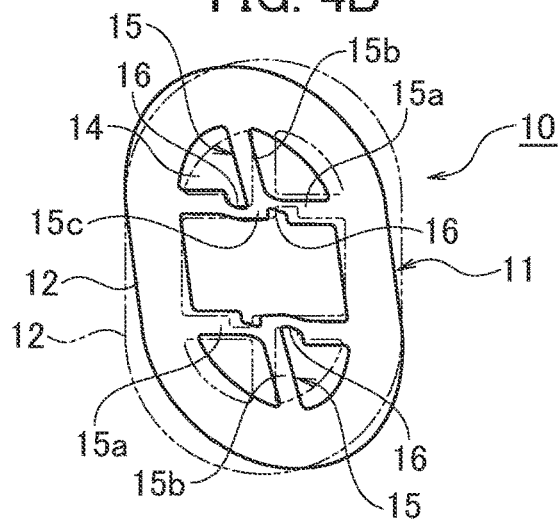
FIG. 4B is a schematic view of the grommet according to the first embodiment of the present application that is being inserted.

As described above, when the grommet 10 according to the first embodiment is inserted into and attached to the through hole H of the door panel P, the cylindrical bellows portion 17 is pulled in the vehicle attachment direction K while the cylindrical bellows portion 17 is rotated, as illustrated in FIG. 1. Consequently, the fitted groove 12a of the enlarged-diameter cylindrical portion 11 is fitted to the through hole H. During the insertion, the depressions 16 for deformation between which the intersection 15c of the lateral rib 15a of each of the reinforcement ribs 15 exists become bending points, as illustrated in FIG. 4B. Consequently, the enlarged-diameter cylindrical portion 11 is more easily deformed diagonally. The insertion force is smaller. The grommet 10 is more efficiently attached.

Figure 4C:
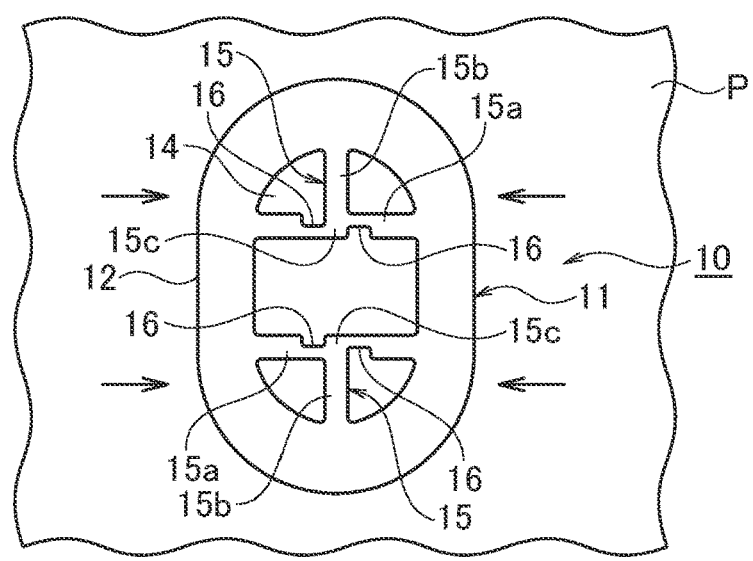
FIG. 4C is a schematic view of the grommet according to the first embodiment of the present application that has been attached to and is held in a vehicle.

Further, after the grommet 10 is attached to the door panel P, the lateral ribs 15a of the reinforcement ribs 15 that are T-shaped are linear, as illustrated in FIG. 4C. Therefore, a holding force that holds the grommet 10 in the door panel P is not influenced.

As described above, when the grommet 10 is inserted into the through hole H of the door panel P, the grommet 10 is inserted while the grommet 10 is rotated. Therefore, the reinforcement ribs 15 are more easily deformed. The insertion force is decreased. When the grommet 10 that has been attached is held, the reinforcement ribs 15 decrease a deformation of the grommet 10, and thus increase a holding force. The reason is that the lateral rib 15a and the lengthways rib 15b of each of the reinforcement ribs 15 are connected with each other at the intersection 15c, and thus the reinforcement ribs 15 are T-shaped.

Figure 5:
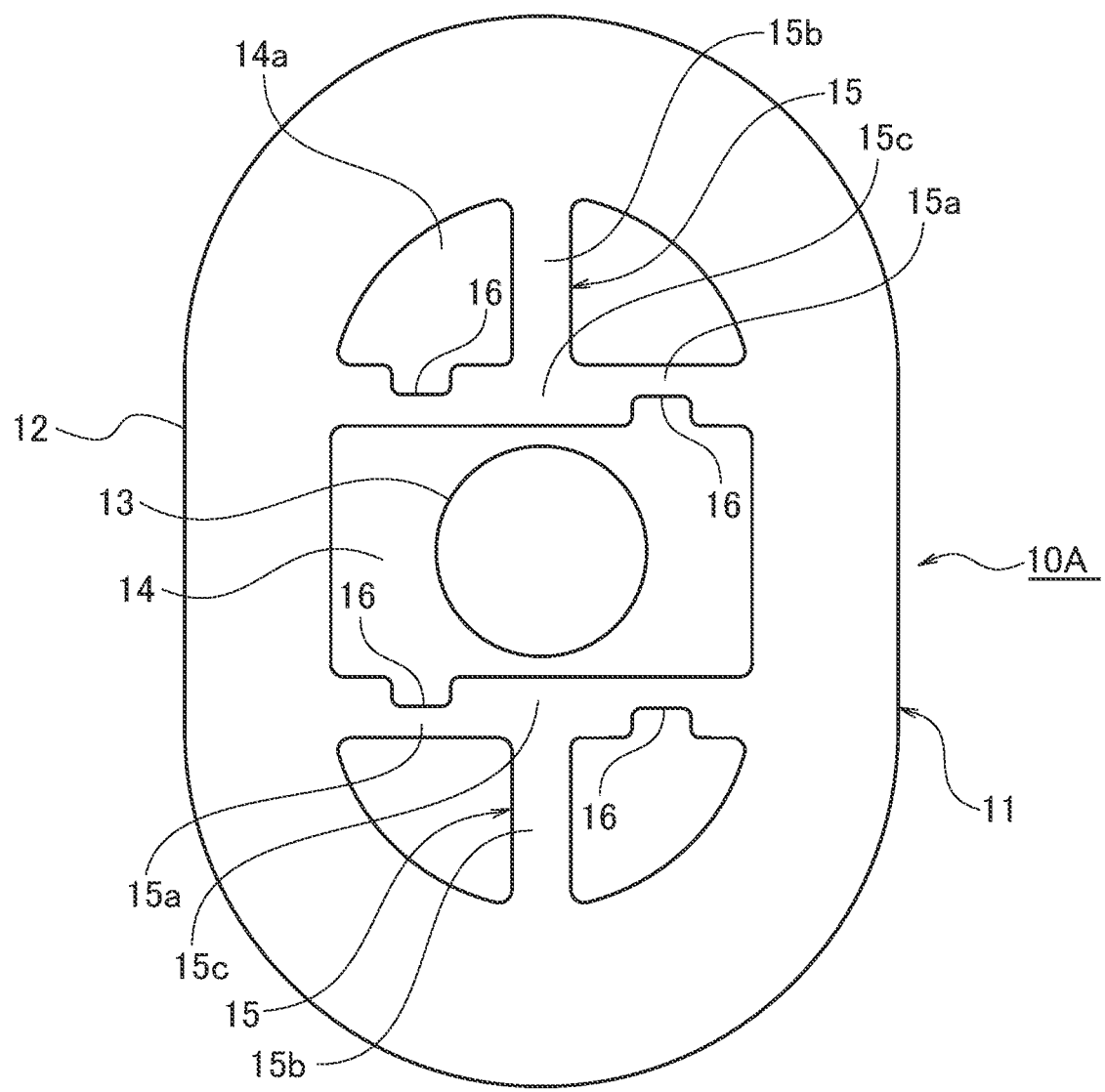
FIG. 5 is a back view that illustrates one example of a grommet according to a second embodiment of the present application.
Figure 6A:
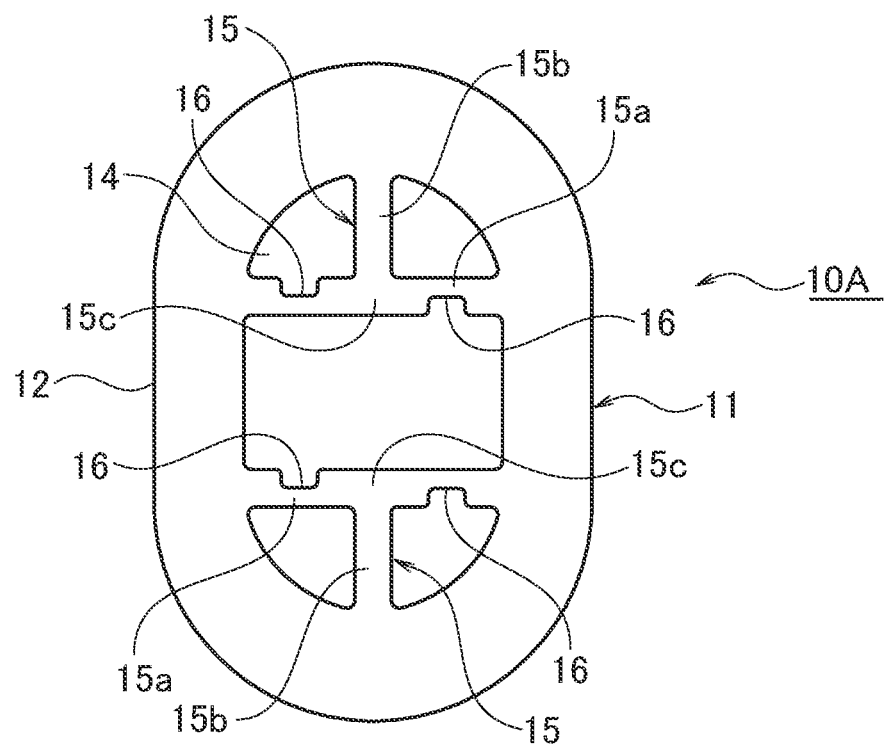
FIG. 6A is a schematic view of the grommet according to the second embodiment of the present application that has not been inserted.
Figure 6B:
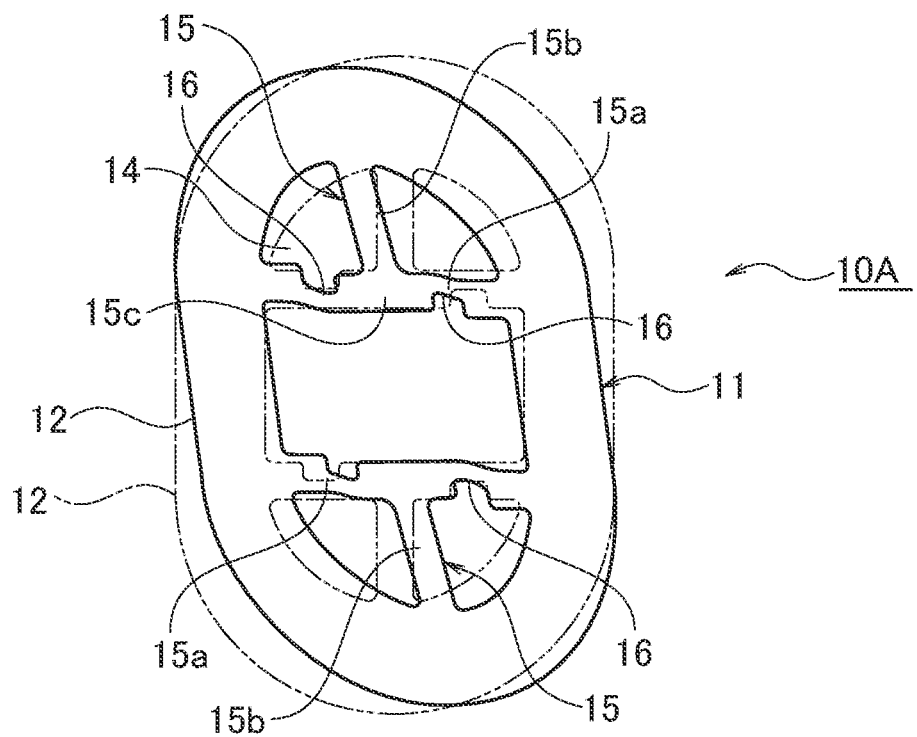
FIG. 6B is a schematic view of the grommet according to the second embodiment of the present application that is being inserted.

FIG. 5 is a back view that illustrates one example of a grommet according to a second embodiment of the present application. FIG. 6A is a schematic view of the grommet that has not been inserted. FIG. 6B is a schematic view of the grommet that is being inserted.

A difference between a grommet 10A according to the second embodiment and the grommet 10 according to the first embodiment is positions of depressions 16 for deformation. The depressions 16 for deformation are at intermediate positions of each of lateral ribs 15a. The intermediate positions are apart from an intersection 15c of each of the lateral ribs 15a along a shorter axis of an enlarged-diameter cylindrical portion 11. The depressions 16 for deformation face in the opposite directions. The other configuration of the second embodiment is similar to the configuration of the first embodiment. Therefore, the same components are designated by the same reference numerals and will not be described in detail.

In the grommet 10A according to the second embodiment, reinforcement ribs 15 protrude from an interior surface 14a of an elastically deformable portion 14. The reinforcement ribs 15 are T-shaped. Each of the reinforcement ribs 15 has a lateral rib 15a. The lateral rib 15a has depressions 16 for deformation at intermediate positions of the lateral rib 15a. The intermediate positions are apart from an intersection 15c of the lateral rib 15a along the shorter axis of the enlarged-diameter cylindrical portion 11. The depressions 16 for deformation face in the opposite directions. Therefore, the grommet 10A according to the second embodiment has action and effect that are similar to the action and effect of the grommet 10 according to the first embodiment.

That is to say, when the grommet 10A is inserted into a through hole H of a door panel P, the depressions 16 for deformation become bending points, as illustrated in FIG. 6B. The depressions 16 for deformation are at intermediate positions of the lateral rib 15a of each of the reinforcement ribs 15. The depressions 16 for deformation face in the opposite directions. Therefore, the reinforcement ribs 15 are easily deformed when the grommet 10A is inserted while the grommet 10A is rotated. Consequently, the insertion force is decreased. When the grommet 10A that has been attached is held, the reinforcement ribs 15 decrease a deformation of the grommet 10A, and thus increase a holding force. The reason is that the lateral rib 15a and the lengthways rib 15b of each of the reinforcement ribs 15 are connected with each other at the intersection 15c, and thus the reinforcement ribs 15 are T-shaped.

The present embodiments have been described above. However, the present application is not limited to the present embodiments. The present embodiments are variously modified within a scope of a gist of the present application.

That is to say, the grommet is used in a side door in each of the embodiments. However, the grommet may be used in other vehicle parts, such as a back door.

Further, the smaller-diameter cylindrical portion includes the cylindrical bellows portion that includes elastic folds in each of the embodiments. However, the smaller-diameter cylindrical portion may include an elastic cylinder.

Next, a comparative example will be described. A main body of a grommet according to a comparative example includes a peripheral wall, an insertion cylinder, and an elastic wall. The peripheral wall is cylindrical. An annular groove extends around the peripheral wall. The annular groove is fitted to a through hole of a panel. The insertion cylinder has a small diameter. A wire harness is inserted in the insertion cylinder. The elastic wall is between the peripheral wall and the insertion cylinder. The elastic wall is integral with the peripheral wall and the insertion cylinder. Further, a reinforcement rib protrudes from an interior surface of the main body of the grommet. That is to say, the reinforcement rib protrudes from an interior surface of the peripheral wall and an interior surface of the elastic wall. The reinforcement rib has a shape like a cross.

However, when the grommet according to the comparative example is attached to a vehicle, that is to say when the elastic wall of the main body of the grommet is inserted into a through hole of a panel and the peripheral wall is fitted to the through hole, it is difficult to deform the elastic wall of the main body of the grommet since the interior surface of the main body of the grommet has the reinforcement rib that has a shape like a cross. Therefore, the insertion force is large.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A grommet comprising:

an enlarged-diameter cylindrical portion that has a larger-diameter-side peripheral portion, a fitted groove configured to be fitted to a through hole of a panel, and an elastically deformable portion that extends from the larger-diameter-side peripheral portion to a smaller-diameter-side peripheral portion and is elastically deformable; and a smaller-diameter cylindrical portion that is configured to be connected with the smaller-diameter-side peripheral portion of the enlarged-diameter cylindrical portion, and in which a wire harness is inserted, wherein a reinforcement rib protrudes from an interior surface of the elastically deformable portion of the enlarged-diameter cylindrical portion, and the reinforcement rib is T-shaped, and the reinforcement rib has depressions for deformation, the depressions for deformation face in opposite directions, and an intersection of the reinforcement rib that is T-shaped is between the depressions for deformation.

2. The grommet according to claim 1, wherein the reinforcement rib has a lateral rib and a lengthways rib, and thus is T-shaped, and the lateral rib has the depressions for deformation, the depressions for deformation are near the intersection, and the depressions for deformation face in opposite directions.

3. The grommet according to claim 1, wherein the reinforcement rib has a lateral rib and a lengthways rib, and thus is T-shaped, and the lateral rib has the depressions for deformation, the depressions for deformation are apart from the intersection, and the depressions for deformation face in opposite directions.

4. The grommet according to claim 1, wherein the elastically deformable portion of the enlarged-diameter cylindrical portion has a shape like an elliptical cone, and the elastically deformable portion that has a shape like an elliptical cone has an interior surface, two of the reinforcement rib that is T-shaped are on both sides, respectively, on the interior surface, and the two reinforcement ribs are opposite each other along a longer axis of the interior surface of the elastically deformable portion.

* * * * *